May 28, 1957 C. D. STEPHENS 2,793,458
REEL AND FERRULE LOCK FOR FISHING RODS
Filed Feb. 7, 1955
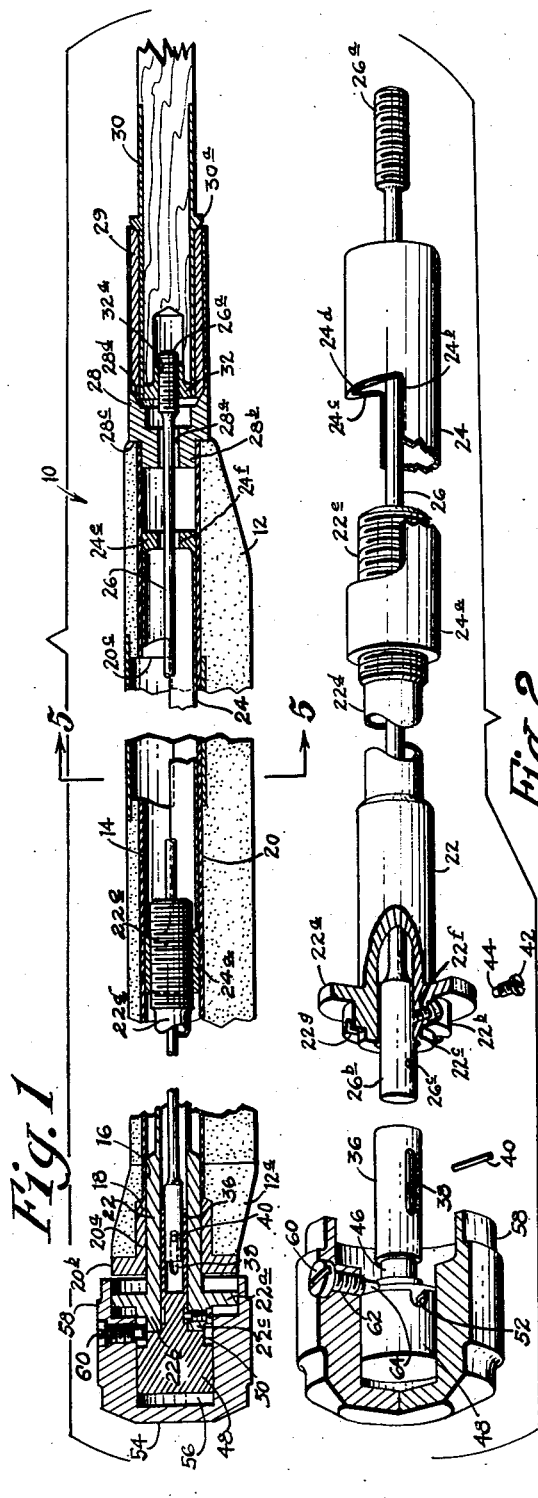
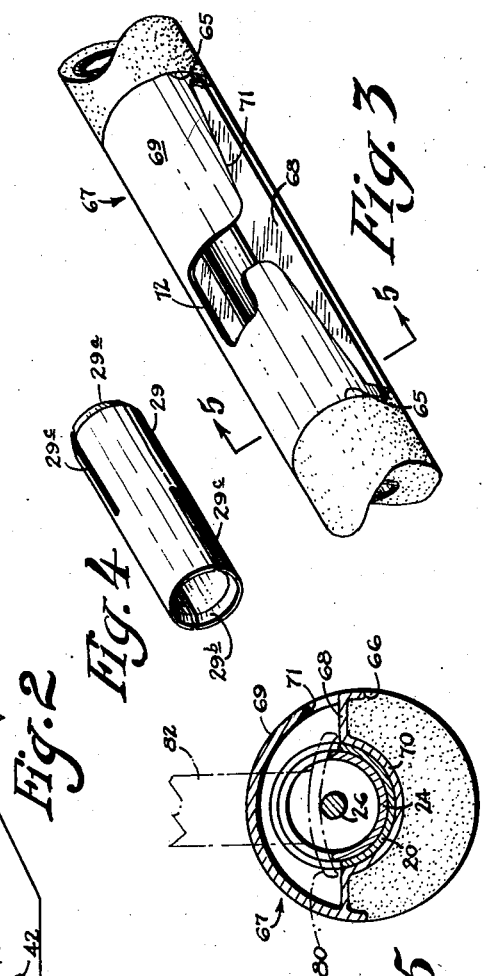
INVENTOR
CHARLES D. STEPHENS
BY Kimmel & Crowell
ATTORNEYS

United States Patent Office 2,793,458
Patented May 28, 1957

---

2,793,458

REEL AND FERRULE LOCK FOR FISHING RODS

Charles D. Stephens, San Antonio, Tex.

Application February 7, 1955, Serial No. 486,572

6 Claims. (Cl. 43—22)

This invention relates to fishing rods, and more specifically, the invention pertains to means for latching a reel and a rod ferrule to the handle member of the rod.

One of the primary objects of this invention is to provide selectively adjustable means for locking the reel and a rod ferrule to the handle member of the rod.

Another object of this invention is to provide a fishing rod handle member with a configuration which permits greater clearance between the reel and hand, thereby preventing the line carriage bail from striking the hand.

A still further object of this invention is to provide a device of the type described which is inexpensive to manufacture and assemble, non-complex in operation, and durable in use.

Other and further objects and advantages of the present invention will become more evident from a consideration of the following specification when read in conjunction with the annexed drawing, in which:

Figure 1 is a longitudinal cross-sectional view of a fishing rod handle and locking means for the reel and a ferrule of the rod, the construction being in accordance with the teachings of the present invention.

Figure 2 is an exploded perspective view of the locking means for the reel and the ferrule.

Figure 3 is an enlarged perspective view showing the details of the reel seat.

Figure 4 is an enlarged perspective view of the ferrule adapter member.

Figure 5 is an enlarged transverse cross-sectional view taken on the vertical plane of line 5—5 of Figure 1, looking in the direction of the arrows.

Referring now more specifically to the drawing, reference numeral 10 designates, in general, a fishing rod handle member and locking mechanism for a reel and a rod ferrule constructed in accordance with the teachings of this invention. The rod handle is seen to comprise an elongated tubular member 12 formed of cork or other suitable material. The handle member 12 terminates at one of its ends in a substantially cylindrical offset portion 12a. The handle member 12 is provided with a cylindrical passage 14 which extends longitudinally therethrough parallel to but offset from the longitudinal axis of the handle member 12. The passage 14 is in open communication at one of its ends with one end of a passage 16 formed in offset handle portion 12a. The other end of the passage 16 is enlarged at 18 and terminates at the outer end of the offset handle portion.

An elongated hollow substantially cylindrical member 20 is disposed within the passages 14 and 16 and is provided with an enlarged boss 20a that extends through the passage 18. The boss 20a terminates in a radial flange 20b which lies flush against the outer end of the offset handle portion 12a.

An elongated hollow substantially tubular member 22 is disposed within the cylindrical member 20 and is integrally formed with a radial flange 22a which confronts the radial flange 20b. Outwardly of the flange 22a, the member 22 is reduced in diameter to form a pair of collars 22b and 22c of reduced diameters to which further reference will be made below. The tubular member 22 is reduced in diameter at 22d and connects with one end of a somewhat enlarged externally threaded boss 22e.

An elongated hollow cylindrical reel lock member 24 is mounted for reciprocation within the cylindrical member 20 and is provided with an internally threaded end portion 24a at one end thereof which receives therein the threaded boss 22e. The reel lock member 24 is cut out at 24b including an under cut portion 24c which forms a reel clamp jaw 24d. The other end of the reel lock member 24 is provided with an integrally formed closure wall 24e which is centrally apertured at 24f.

An elongated cylindrical rod 26 extends longitudinally through the cylindrical member 22 and is coaxially positioned relative thereto. As is seen in Figures 1 and 2, the rod 26 has an end portion thereof which extends through a bore 28a formed in one end of an elongated substantially hollow tubular support member 28. The support 28 is formed with a reduced neck portion 28b to establish a shoulder 28c adapted to seat tightly against the adjacent end of the handle member 10. The support member 28 is provided with an internal annular flange 28d intermediate the ends thereof. An adapter element 29 having inner and outer bevelled ends 29a, 29b is disposed within the support member 28 with the end 29a engaging against the flange 28d.

A rod ferrule 30 and outwardly inclined angular circumferential flange 30a is disposed within the adapter 29 and is positioned therein with its angular flange 30a engaging against the bevelled outer end 29b of the adapter 29.

A flanged plug 32 having an internally threaded bore 32a is fixedly secured by conventional means to the inner end of the ferrule 30, and the bore 32a is threadedly engaged by the enlarged threaded boss 26a of the rod 26.

The enlarged cylindrical boss 26b at the other end of the rod 26 is provided with a diametrically extending bore 26c and and the boss is telescoped into a hollow tubular extension 36 having diametrically opposed slots 38 (only one being shown) formed therein which, when in registry with the bore 26c, is adapted to be connected with the boss 26b by means of the pin 40. The connection affords relative longitudinal movement between the extension 36 and the rod 26 as well as connecting the same for rotation in the same direction.

The collar 22b is provided with a radially extending threaded tap 22f and receives therein a set screw 42 having a reduced inner end 44 which rides in a circumferential groove 46 formed in the extension 36. The collar 22b is also formed with a plurality of recesses 22g, the function of which will be described below.

The hollow extension member 36 comprises an integral part of a substantially solid cylindrical element 48 having an integrally formed neck 50 of reduced diameter interposed therebetween. The diameter of the neck 50 is substantially equal to the diameter of the collar 22c. The cylindrical element 48 is formed with a plurality of inwardly extending recesses 52.

A hollow cylindrical knob 54 having a longitudinal passage 56 extending inwardly from an end thereof is telescoped over the cylindrical element 48, and the inner end of the knob 54 terminates in a circumferential skirt 58 which surrounds the flange 22a. A screw 60 extends through a threaded tapped opening 62 and has a reduced end portion 64 adapted to ride on the neck 50 and the collar 22c intermediate the recesses 22g and 52 or, upon longitudinal movement of the knob relative to the handle, to enter one of the named recesses.

The handle member 10 is provided with cut out portion 65 intermediate its ends which is adapted to receive therein a reel seat 67. As is seen in Figures 3 and 5, the reel seat 67 comprises an elongated semi-circular metallic strip forming a top wall 69, the side edges of which are seated within a pair of longitudinally extending grooves 66 formed in the handle member 10. The top wall 69 is traversed by a bottom wall 68 having a depressed longitudinally extending central wall portion 70.

The top wall 69 at one side thereof is constructed with an elongated slot 71 which communicates at its upper end with a bayonet slot 72 formed centrally in the top wall 69. The depressed portion 70 of the bottom wall 68 receives the lower portion of the tubular member 20 which has a cut out portion 20c oppositely disposed with respect to the cut out portion 24b.

The adapter 29 is provided with a plurality of circumferentially spaced and longitudinally extending slots 29c to afford a certain degree of expansion and contraction upon insertion therein of ferrules having various diameters.

In operation, a reel, not shown, is inserted through the slot 71 with the base 80 thereof engaging the bottom wall 68 of the reel seat 67 on opposite sides of the depressed portion 70. The riser 82 of the reel is engaged within the bayonet slot 72.

After this operation and assuming the associated elements are in their respective positions as shown in Figure 1, the operator now rotates the knob 54 and pushes it inwardly until the end portion 64 of the screw 60 enters one of the recesses 22g. Continued rotation of the knob 54 causes the reel lock 22 to move toward the knob to effect engagement of the clamp jaw 24d with the reel base 80. Rotation is continued until the flange 22a locks flush against the flange 20b.

The screw 60 is now disengaged from the recess 22f and is pulled away from the handle 10 and rotated until it engages one of the recesses 52. Continued rotation of the knob rotates the rod 26 and causes the ferrule 30, the adapter 29, and support member 28 to move inwardly relative to the handle 10 and to tighten the collar 22c against the adjacent end of the handle member 10. Thus the reel and the ferrule are locked firmly to the handle.

To disassemble the rod, the above sequence of operations are performed in reverse order.

Having described and illustrated one embodiment of this invention it is to be understood that the same is offered merely by way of example, and that the invention is to be limited only by the scope of the appended claims.

What is claimed is:

1. In a fishing rod handle member having an opening therein to receive the base of a fishing reel therethrough, means for reciprocable means for releasably locking said fishing reel base in said handle intermediate the ends thereof, means at one end thereof for connecting a fishing rod ferrule thereto, and a single means for operating said first and second means in successive operations.

2. In a fishing rod handle member having an opening formed therein to receive the base of a fishing reel therethrough, means disposed within said handle for releasably locking a fishing reel therein intermediate the ends thereof, means extending through said handle and threadedly engaging one end of a fishing rod ferrule for tightening said one end of said ferrule against one end of said handle member, and means connected to said first and second means adjacent the other end of said handle member for selective operation of said first and second means.

3. In a fishing rod handle member, means at one end of said member for connecting a fishing rod ferrule thereto, a clamping jaw disposed within said handle, means within said handle for moving said jaw into clamping engagement with the base member of a fishing reel, said base member being positioned within said handle, and means adjacent the other end of said handle member connected with said first and second means for selective operation of either independently of the other.

4. In a fishing rod handle member, a rod ferrule means extending longitudinally through said handle member and projecting beyond one end thereof for threaded engagement with one end of said rod ferrule, a reel base seat disposed within said handle member, a clamping jaw disposed within said handle and adapted for movement toward said base to releasably clamp said base to said seat, means extending longitudinally of said handle for effecting movement of said jaw, and means adjacent the other end of said handle member and operably connected with said first and second means for activating the same, said operation being selective.

5. In a fishing rod handle member as defined in claim 4, said fishing rod handle member having an elongated passageway extending longitudinally therethrough, said passageway being offset and parallel to the longitudinal axis of said handle member, and said first and second means extending longitudinally of said passageway.

6. In a fishing rod handle member as defined in claim 4, and a rod ferrule adapter interposed between said rod ferrule and the adjacent end of said handle member.

References Cited in the file of this patent

UNITED STATES PATENTS

| 330,005 | Donaghy | Nov. 10, 1885 |
| 902,673 | Moench | Nov. 3, 1908 |
| 2,454,122 | Barger | Nov. 16, 1948 |
| 2,566,647 | Wissman | Sept. 4, 1951 |
| 2,667,713 | Stephens | Feb. 2, 1954 |
| 2,702,192 | Warth | Feb. 15, 1955 |

FOREIGN PATENTS

| 476,224 | Italy | Dec. 3, 1952 |